United States Patent
Sugikawa

(10) Patent No.: US 6,500,582 B1
(45) Date of Patent: Dec. 31, 2002

(54) METHOD OF PRODUCING ELECTRODE FOR BATTERY AND ELECTRODE PRODUCED BY METHOD

(75) Inventor: Hirofumi Sugikawa, Toyonaka (JP)

(73) Assignee: Katayama Special Industries, Ltd., Osaka-Fu (JP)

( * ) Notice: Subject to any disclaimer, the term of this patent is extended or adjusted under 35 U.S.C. 154(b) by 0 days.

(21) Appl. No.: 09/451,769

(22) Filed: Dec. 1, 1999

(30) Foreign Application Priority Data

Dec. 2, 1998 (JP) .......................... 10-343392

(51) Int. Cl.⁷ .................. H01M 4/62; H01M 4/50
(52) U.S. Cl. .................. 429/217; 429/59; 429/218.2; 429/223
(58) Field of Search .................. 429/59, 223, 217, 429/218.2

(56) References Cited

U.S. PATENT DOCUMENTS 5,542,958 A * 8/1996 Furukawa .................. 429/59 X

FOREIGN PATENT DOCUMENTS

EP    0 717454 A1    6/1996
EP    0 864 389 A1    9/1998

OTHER PUBLICATIONS

6001 Chemical Abstracts vol. 109, No. 18, Oct. 1, 1988, p. 623, Furuya, C. et al., "A Method for Manufacturing a Reaction Film for a Gas–Diffusion Electrode or a Gas–Diffusion Film".

* cited by examiner

*Primary Examiner*—John S. Maples
(74) *Attorney, Agent, or Firm*—Sughrue Mion, PLLC

(57) ABSTRACT

An electrode for a battery produced by a method comprising the steps of continuously forming a metallic porous foil consisting of metal powders having fine voids; attaching powders of an active substance not containing a binder; fixing the powders into the fine voids and the surface of the foil under pressure by passing rollers; forming a binder coating layer on surfaces of the powders by introducing the foil into a binder-tank; drying the binder coating layer; and setting a thickness of the foil by passing pressure rollers.

8 Claims, 20 Drawing Sheets

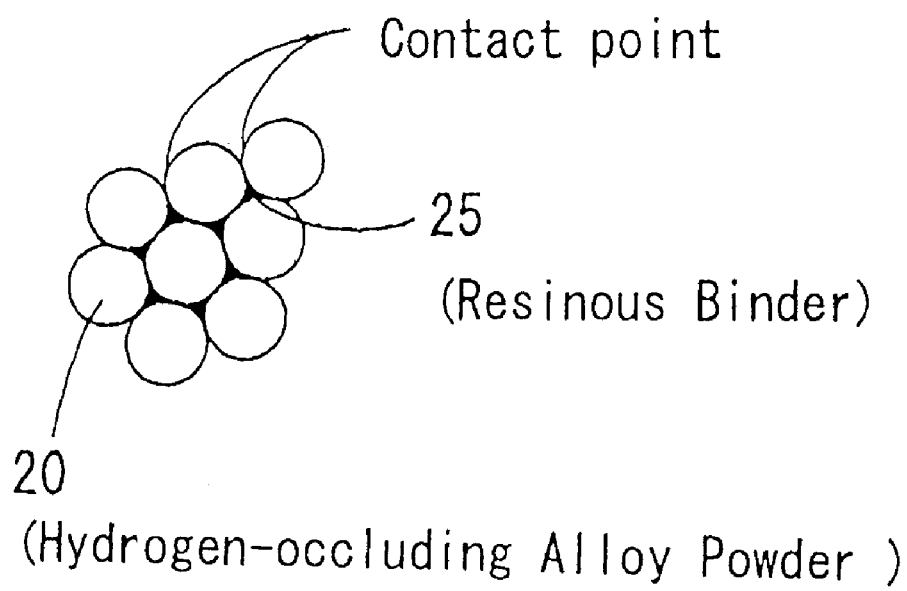

METHOD OF PRODUCING ELECTRODE FOR BATTERY AND ELECTRODE PRODUCED BY METHOD

BACKGROUND OF THE INVENTION

1. Field of the Invention

The present invention relates to a method of producing an electrode for a battery and the electrode produced by the method. More particularly, the present invention relates to a method of forming a metallic porous foil from metal powder, filling a void of the metallic porous foil with a powder of an active substance, and fixing it to a surface of a sheet of the metallic porous foil. The method is preferably used to produce a negative electrode of a nickel hydrogen battery. In addition, the method is preferably used to produce a positive electrode of the nickel hydrogen battery, and further to produce electrodes of various kinds of batteries such as a nickel cadmium battery, a lithium primary battery, a lithium secondary battery, an alkaline dry cell, a fuel cell, and a battery for a vehicle.

2. Description of the Related Art

Conventionally, a negative electrode of the nickel hydrogen battery is produced as follows: Hydrogen-storing alloy powders are kneaded with binder (binding agent), carbon (electrically conductive material), and the like to obtain a pasty active substance. Then, the pasty active substance is filled into three-dimensional pores of a three-dimensional metallic porous plate such as a foamed sheet-shaped metallic porous plate and a nonwoven fabric-like metallic porous plate used as a base material of an electrode; or the pasty active substance is applied to a metallic porous plate produced by forming pores on a metallic plate such as a punching metal, a lath, and the like. Finally, the metallic porous plate is passed between a pair of pressure rollers one to four times to pressurize the plate after the pasty active substance is dried to produce the electrode.

However when the metallic porus plate having the three-dimensional pores is pressurized after the pasty active substance is applied thereto, a skeleton surrounding the three-dimensional pores is destroyed by the powder of the active substance. Therefore, an electrode thus formed is not flexible and is hard.

More specifically, the thickness of the skeleton surrounding the pores of the foamed metallic porous plate and the nonwoven cloth-like metallic porous plate is as small as 30–50 $\mu$m, and the hydrogen-storing alloy powders used as the active substance of the nickel hydrogen battery are hard. Thus, the hydrogen-storing alloy powders may destroy the skeleton of the pores of the foamed metallic porous plate and the nonwoven cloth-like metallic porous plate.

On the other hand, the metallic porous plate produced by forming pores on the metallic plate such as the punching metal, the lath, and the like has a high degree of strength. Thus, the metallic porous plate is not destroyed by the hydrogen-storing alloy powders. The pores formed on the metallic plate are not three-dimensional. Therefore, to fix the hydrogen-storing alloy powders to the metallic porous plate, it is necessary to apply the pasty hydrogen-storing alloy powders thereto and pressurize the metallic porous plate repeatedly at a high degree after the pasty hydrogen-storing alloy powders are dried. However, when the metallic porous plate is pressurized repeatedly at a high degree, an electrode thus produced is very hard.

In the case where the negative electrode having base material, in which the hydrogen-storing alloy powders have been filled, is used for a cylindrical battery, the negative electrode is spirally wound together with a positive electrode via a separator to accommodate both electrodes in a battery can.

However, because the negative electrode produced as described above is hard, the electrode is cracked when it is wound. Normally, the electrode is accommodated in a battery can, with a crack left thereon. The occurrence of the crack causes an alloy powder layer of the active substance to drop from an electricity collecting material. As a result, flow of electric current is not favorable in the electrode and the electric resistance becomes high, which deteriorates the characteristic of the battery. Therefore, in a conventional method, preventive measures are taken by forming fine cracks intentionally in the electrode to prevent large cracks from being generated when it is wound. However, the alloy powder layer drops from the cracks. Thus, the preventive measures cannot solve the above-described problem that causes the characteristics of the battery to deteriorate.

Further, according to the conventional method, a pasty binder is kneaded with powder of hydrogen-storing alloy powder, and a mixture thereof is applied to a metallic porous plate. According to this method, the entire surface of alloy powders is likely to be coated with the binder. In this case, the alloy powders do not contact each other, and the binder disturbs the flow of electric current. Especially, electricity collection performance at a thickness of the electrode decreases, which deteriorates a characteristic of the battery.

SUMMARY OF THE INVENTION

The present invention has been made in view of the above-described situation. Thus, it is a first object of the present invention to provide an electrode for a battery which does not become hard when pressurization is repeated to securely fill an active substance such as hydrogen-storing alloy powder into a base material of an electrode and fix it thereto and which does not crack when the electrode is wound spirally.

It is a second object of the present invention to improve electricity collection performance by contacting powders of the active substance with each other directly.

In order to achieve the object, there is provided a method of producing an electrode for a battery comprising the continuous steps of:

forming a metallic porous foil consisting of metal powders in which adjacent powders are contacted and bonded with each other and gaps between non-contact powders form fine voids;

applying powders of an active substance not containing a binder to a surface of the metallic porous foil at a required position while the metallic porous foil is being conveyed continuously;

filling the powders of the active substance into the fine voids of the metallic porous foil and fixing the powders on the surface of the metallic porous foil under pressure by passing the metallic porous foil between a pair of rollers immediately after the powders of the active substance is applied to the metallic porous foil or while the powders of the active substance is being applied to the metallic porous foil;

forming a binder coating layer on surfaces of the powders of the active substance positioned at the surface of the metallic porous foil by introducing the metallic porous foil into a tank accommodating a liquid binder;

drying the binder coating layer by introducing the metallic porous foil into a drying oven;

and setting the metallic porous foil to a required thickness by passing the metallic porous foil sequentially between a plurality of a pair of pressure rollers arranged along a conveying path.

For example, the powders of the active substance not containing a binder are applied to both surfaces of the metallic porous foil by introducing the metallic porous foil into a hopper accommodating the powders of the active substance. The metallic porous foil, which has the powders of the active substance applied to it, is passed under pressure between a pair of rollers disposed at an exit position of the hopper so that the powders of the active substance are filled into the fine voids of the metallic porous foil and fixed to both surfaces of the metallic porous foil. Thereafter, the metallic porous foil is introduced into a tank accommodating a liquid binder so that binder coating layers are formed on the surfaces of the powders of the active substance, which have been applied to the both surfaces of the metallic porous foil.

According to the present invention, as described above, the metallic porous foil consisting of metal powders and having fine voids consisting of gaps between non-contact portions of the metal powders is used as the base material of the electrode. Because the metallic porous foil has the fine voids, powders of the active substance can be filled into the voids.

The metallic porous foil is entirely flexible, and the gaps between adjacent powders can be increased and decreased, whereby the powders of the active substance are filled into the fine voids. Thus, when the metallic porous foil is passed between a plurality of pressure rollers after the powders of the active substance have been applied to the metallic porous foil, the powders of the active substance penetrate gradually into the voids consisting of the gaps between metal powders of the metallic porous foil. In other words, the metallic porous foil penetrates into the gaps between the adjacent powders of the active substance while the metallic porous foil is deflecting. In this state, the metallic porous foil serves as a cushioning medium between the adjacent powders of the active substance. Therefore, even though the metallic porous foil is pressurized repeatedly, it does not become hard and holds its flexibility, unlike the conventional metallic porous foil, and further the holding force of the alloy powders of the active substance by the metallic porous foil is increased.

As described above, when the metallic porous foil is pressurized repeatedly, the metallic porous foil penetrates into the gaps between the powders of the active substance while the metallic porous foil is deflecting. In other words, the powders of the active substance deflect the metallic porous foil. Accordingly, it is possible to produce an electrode is not hard, but is flexible. Therefore, when the electrode is used for a cylindrical battery, the electrode can be wound easily without cracking of the electrode. Further, the base material consisting of the metallic porous foil penetrates into the gaps between the adjacent powders of the active substance and strongly holds the powders of the active substance. Thus, it is possible to prevent a layer of the active substance from dropping from the base material.

Further, because the powders of the active substance that are applied to the metallic porous foil composing the base material of the electrode do not contain a binder, the powders of the active substance contact each other directly. Therefore, it is possible to solve the conventional problem of deterioration of the electricity collection performance of the metallic porous foil, which occurs as a result of the non-contact of the powders of the binder-containing active substance caused by the presence of the binder between the adjacent powders of the active substance applied to the metallic porous foil. Thus, it is possible to improve battery characteristics of cylindrical and square pillar-shaped batteries.

As described above, the powders of the active substance not containing the binder are applied to the metallic porous foil, then the metallic porous foil is pressurized by a roller to fill the powders of the active substance into voids thereof and to fix them to the surface thereof, and then the metallic porous foil is introduced into a liquid binder tank to immerse the metallic porous foil in the binder. In this process, the binder forms a thin coating layer on the surface of the layer of the powders of the active substance. Thus, it is possible to prevent the powders of the active substance from dropping from the layer thereof formed on the surface of the metallic porous foil. Moreover, the binder penetrates into gaps between non-contact portions of the adjacent powders of the active substance and into remaining gaps between the powders of the active substance and the metallic porous foil. Thus, the binder adheres the powders of the active substance strongly thereto without preventing direct contact of the powders of the active substance and fixes the powders of the active substance and the metallic porous foil strongly to each other. That is, the binder can be used for only the fixing action without preventing flow of electric current.

Further, in the present invention, subsequent to the process of forming the metallic porous foil composing the base material for an electrode from metal powders, the powders of the active substance are continuously supplied to the metallic porous foil at a required pressure. In this manner, an electrode can be manufactured continuously. Accordingly, it is possible to improve the productivity of the electrode and thus produce it at a low cost.

The metallic porous foil is formed from nickel powder, and the powders of the active substance are composed mainly of hydrogen-storing alloy powder. The metallic porous foil of the nickel powder is preferably used in producing a negative electrode of a nickel hydrogen battery. In the case of the negative electrode of the nickel hydrogen battery, preferably the hydrogen-storing alloy powder to be used as the powder of the active substance has an average diameter of 10 $\mu$m–100 $\mu$m. Preferably, the density of the hydrogen-storing alloy powder is 5.0–6.5 g/cc, when it is filled into and fixed to the electrode.

The powder of the active substance is not limited to the hydrogen-storing alloy powder, but the hydrogen-storing alloy powder or a mixture of the hydrogen-storing alloy powder and Ni powder or/and a transition metal powder such as Cu powder or the like may be used to produce the negative electrode of the nickel hydrogen battery. As described above, electricity collection performance thereof can be enhanced by mixing the hydrogen-storing alloy powder with the Ni powder, instead of carbon hitherto used as an electrically conductive material.

As described above, the powder of the active substance is composed of metal powder or alloy powder without adding a binder, the surface of each metal powder and that of each alloy powder is not coated with the binder, and the powders contact each other directly. Thus, electric current flows through the active substance preferably and electric resistance can be reduced. Thus, battery characteristics can be improved.

The powder of the active substance is pressed against the metallic porous foil with a roller, thereafter a powder of a transition metal is applied on the metallic porous foil on the surface of a layer of the active substance powder, and then the metallic porous foil is pressed with a roller. Continuously, the metallic porous foil is introduced into a liquid binder tank. According to the above steps, the surface of the layer of the hydrogen-storing alloy powder is coated with a layer of the transition metal, and the surface of the layer of the transition metal is coated with a binder layer. It is also possible for the liquid binder to contain the powder of the transition metal to form a binder coating layer containing the transition metal.

That is, in the case where it is preferable to coat the surface of the active substance layer with the transition metal, the transition metal is applied to the surface of the layer of the hydrogen-storing alloy powder in a later process, separately from the hydrogen-storing alloy powder.

The metallic porous foil may be produced as follows:

The metal powder is spread on a conveyor belt or a supporting sheet placed on the conveyor belt which is conveying continuously. Then, the conveyor belt or the supporting sheet on which the metal powder has been spread is passed between a pair of rollers to press the metal powder at a low force. As a result, adjacent metal powders contact partly each other, with gaps present between them. Then, the metal powder on the conveyor belt or on the supporting sheet is introduced into a sintering oven to sinter the metal powder. Then, the metal powder is separated from the conveyor belt or the supporting sheet.

As the conveyor belt, a solid metal sheet, an inorganic sheet including a metallic porous sheet or a layer of these sheets is used in a circulation driving apparatus of belt conveyor type. For example, the conveyor belt is made of SUS (310S). Metal powder spread on the conveyor belt is rolled at a low pressure and sintered to form a sheet, and the sheet can be separated from the surface of the conveyor belt. By introducing the conveyor belt that is moved continuously into the sintering oven, it is possible to form the metallic porous foil from metal powder continuously and very efficiently.

As described above, when the metal powders spread on the conveyor belt are rolled at a low pressure, spherical surfaces of adjacent metal powders are in point contact or line contact. That is, they do not contact each other entirely but have gaps present between them. Thus, when they are heated in the above-described contact state in the sintering oven, portions thereof in contact with each other are fixed with each other to form the metallic porous foil continuously, with gaps between the metal powders forming fine voids. The size of the formed void of the metallic porous foil depends on the size of the metal powder. That is, when the diameter of the metal powder is large, the void is large, whereas when the diameter thereof is small, the void is small. The metal powder having a diameter of 0.1 $\mu$m–100 $\mu$m is preferably used.

The kinds of metal for the metallic porous foil is not limited to a specific one, but the following metals can be preferably used: Ni, Cu, Al, Ag, Fe, Zn, In, Ti, Pb, V, Cr, Co, Sn, Au, Sb, C, Ca, Mo, P, W, Rh, Mn, B, Si, Ge, Se, La, Ga, and Ir; oxides and sulfides of these metals; and a substance or a mixture containing a compound of these metals. That is, it is possible to use Al, Ti, and V that cannot be used in electroplating. It is also possible to use powders of these metals alone or by mixing powders of a plurality of these metals with each other. It is preferable that the powders of these metals do not interlock with each other and are dispersive. Therefore, it is preferable that peripheral surfaces of these metals do not have concave and convex portions that interlock with each other. For example, preferably, these metals are spherical, die-shaped, square pillar-shaped, columnar or the like.

When the conveyor belt is porous, metal powder spread thereon drops from the pores of the conveyor belt. Thus, portions corresponding to the pores form through-voids of a metallic porous foil. The through-voids are larger than fine gaps between adjacent metal; powders. Thus, the metallic porous foil produced has fine voids and comparatively large through-voids.

According to the present invention, the metallic porous foil may be formed as follows: The supporting sheet is conveyed continuously; metal powders are spread on the supporting sheet; the supporting sheet on which the metal powders have been spread is conveyed over the conveyor belt; and the supporting sheet and the conveyor belt are passed between a pair of pressure rollers to roll them at a low pressure, with gaps between adjacent metal powders kept. Then they are introduced into a sintering oven to sinter the metal powders, whereby contact portions of the metal powders are fixed with each other and the fine gaps form fine voids. The following sheets can be used preferably as the supporting sheet: an organic sheet including a solid resinous sheet, a three-dimensional reticulate resinous sheet, a porous fibrous resinous sheet; and an inorganic sheet including a solid metal sheet, a metallic porous sheet or a laminate of these sheets.

The metallic porous foil formed by using the supporting sheet can be separated from the conveyor belt more easily than the one formed by spreading the metal powder directly on the conveyor belt of the circulation driving apparatus. Of the a above-described supporting sheets, the resinous sheet is burnt in the resin removal oven. On the other hand, the inorganic sheet such as the metal sheet is not removed by heating. In some cases, the inorganic sheet is separated from the formed metallic porous foil when it is discharged from the sintering oven. In the other case, it is conveyed downstream together with the formed metallic porous foil and wound together therewith. As a result of using a thin metal sheet as the supporting sheet, it is possible to increase the conveying speed and enhance productivity.

In the case where a porous sheet having a large number of pores is used as the supporting sheet, similarly to the case where the conveyor belt is used, it is possible to produce a metallic porous foil having fine voids consisting of gaps present in the adjacent metal powders and large throughpores in the portion thereof corresponding to the pores formed on the supporting sheet.

The conveyor belt or the supporting sheet on which the metal powder has been spread is introduced into a cooling oven disposed continuously with the sintering oven to cool the metal powder after it is sintered.

It is possible to use an electrode substrate, consisting of the metallic porous foil formed by merely sintering the metal powder spread on the conveyor belt or the supporting sheet in the sintering oven without passing it between a pair of the pressure rollers. However, there is a case in which a small number of metal powders contact each other and thus a desired degree of strength cannot be obtained. Therefore, it is preferable to increase the number of connection portions of metal powders by rolling them at a low pressure before they are introduced into the sintering oven after they are spread over the conveyor belt or the supporting sheet.

A mixture of a sublimable fine fragment, which can be burnt, and metal powder may be spread on a conveyor belt or the supporting sheet. Otherwise, the sublimable fine fragment may be spread thereon before the metal powder is spread thereon. Then, the sublimable fine fragment is burnt in a resin removal oven. In this manner, it is possible to produce a metallic porous foil having fine voids consisting of gaps between the adjacent metal powders and voids formed at portions where the sublimable fine fragment is burnt. In the case where a foamed agent or the like, which is decomposed by heating and generates gas, is used as the sublimable fine fragment. through-voids are obtained by the generated gas. In this manner, it is possible to produce a metallic porous foil having through-pores and further, to control the size of the through-void, depending on the size of particles of the sublimable fine fragment.

According to a method other than the above-described methods, the metallic porous foil is formed continuously as follows: That is, metal powders are spread directly over the surface of a pair of pressure rollers. Then, the metal powders are pressed by the pressure rollers at a required force to connect contact portions of the adjacent metal powders with each other and form gaps of non-contact portions thereof as fine voids. It is possible to use a pattern roller as a pair of pressure rollers disclosed in Japanese Patent Application Laid-Open No. 9-287006. The pattern roller has a pattern of a large number of concave portions formed on its peripheral surface to successively form a metallic porous foil having fine voids consisting of gaps between adjacent metal powders and large voids formed by using the pattern of the pattern roller and then fixedly apply powder of an active substance to the metallic porous foil.

The present invention provides an electrode for a battery which is produced by the above-described methods.

The electrode for a battery may be produced by forming voids consisting of fine gaps between adjacent metal powders and pores having a required configuration and being larger than the voids on the metallic porous foil and filling the powder of the active substance into the voids consisting of the fine gaps and into the pores larger than the voids.

That is, to increase the amount of the active substance per area, in addition to voids consisting of fine gaps that are generated between adjacent metal powders, large pores may be formed on a metallic porous foil similar to a conventional punched porous metal plate, and powder of the active substance may be filled into the large pores in addition to the voids consisting of the fine gaps.

The electrode for a battery may be produced by forming burr-formed pores having burrs projecting from one surface or both surfaces of the metallic porous foil or/and concave and convex bent portions on one surface or both surfaces of the metallic porous foil. The burrs and/or the concave and convex bent portions hold the layer of the active substance.

By forming the burr-formed pores to hold the active substance applied to the metallic porous foil with the burrs or/and by forming the concave and convex bent portions on the metallic porous foil to increase an apparent thickness thereof, it is possible to increase the amount the active substance which is held by the burrs or/and the concave and convex portions.

Preferably, the metallic porous foil has a plurality of void-unformed lead portions formed at regular intervals. The layer of the powder of the active substance is not formed on a surface of the lead portion.

The electrode produced by passing the active substance powder-applied base material (porous metallic foil) between a pair of pressure rollers has a thickness of 0.05 mm–6.0 mm. The metallic porous foil consisting of metal powder and serving as the base material of the electrode has a thickness 10 $\mu$m–500 $\mu$m. The void content of a fine gap between the adjacent metal powders is 5–30%. The metallic porous foil has a tensile force of 1 kgf/20 mm–30 kgf/20 mm and an elongation of 0.6–30%. The rate of large pore area of the metallic porous foil is 20–60%.

Although the kind of powder of the active substance which fixes to the metallic porous foil corresponds to the kind of battery, the following active substances can be used: metals such as zinc, lead, iron, cadmium, aluminum, lithium, and the like; metal hydroxides such as nickel hydroxide, zinc hydroxide, aluminum hydroxide, iron hydroxide, and the like; lithium composite oxides such as cobalt oxide lithium, nickel oxide lithium, manganese oxide lithium, vanadium oxide lithium and the like; metal oxides such as manganese dioxide, lead dioxide, and the like; conducting polymer such as polyaniline, polyacetylene, hydrogen-storing alloy, carbon and the like. When the active substance is filled into the base material of the electrode for a battery, according to the conventional method, a conductive agent such as carbon powder and a binder (binding agent) are added to the active substance. On the other hand, according to the present invention, the active substance is filled into the base material of the electrode without adding the binder thereto, as described above. The metallic porous foil of the present invention has fine voids into which the powder of the active substance can be filled without a binder. The void having a three-dimensional structure holds the powder of the active substance at a high degree of strength and thus can hold it without dropping it from the metallic porous foil. Non-addition of the binder to the active substance enhances the electricity collection performance of the electrode dramatically.

The present invention provides a battery having the above-described electrode. The electrode is most favorably used in a nickel hydrogen battery. In addition, the electrode is used in a nickel cadmium battery, a lithium primary battery, a lithium secondary battery, an alkaline dry cell, a fuel cell, and a battery for a vehicle.

BRIEF DESCRIPTION OF THE DRAWINGS

FIG. 2B is an enlarged view showing a state in which the hydrogen-storing alloy powders are applied to a metallic porous foil and then the metallic porous foil is immersed in a resinous binder according to the present invention.

DETAILED DESCRIPTION OF THE PREFERRED EMBODIMENTS

Figure 1:
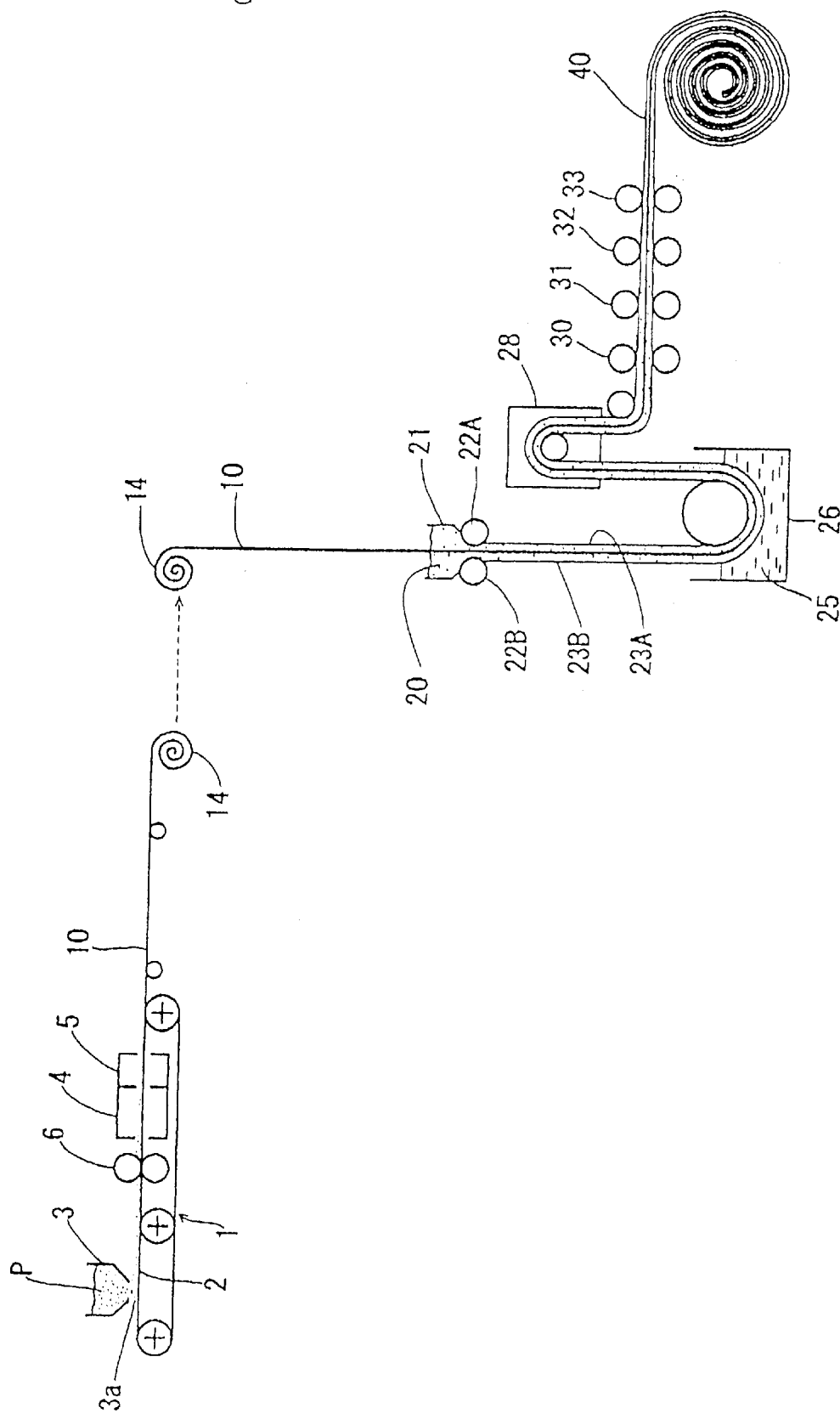
FIG. 1 is a schematic view showing an apparatus for carrying out a method of a first embodiment of the present invention.

The present invention will be described below with reference to the embodiments shown in the drawings.

FIG. 1 shows a first embodiment. A hopper 3 for storing metal powders P is installed over an endless conveyor belt 2 of a circulation driving apparatus 1 of belt conveyor type such that the hopper 3 is located at the upstream side of the conveyor belt 2. After the conveyor belt 2 is passed between a pair of pressure rollers 6 positioned downstream from the hopper 3, it is conveyed to a sintering oven 4 and a cooling oven 5. The conveyor belt 2 is made of SUS (310S) and flexible. A metering controller (not shown) is installed at a discharge port 3a located at the lower end of the hopper 3 to spread the metal powders P on the upper surface of the conveyor belt 2 at a required density and a required thickness. The metal powders P are preferably spherical, flake-shaped or spike-shaped and have a diameter of 0.1 $\mu$m–100 $\mu$m. The application amount of the metal powders P to the conveyor belt 2 per centare is set to the range of 40 g/m$^2$–4.4 kg/m$^2$.

As the conveyor belt 2 moves downstream, the metal powders P spread on the conveyor belt 2 pass between a pair of the pressure rollers 6. Because the load of the pressure roller 6 is set low, voids (gaps) $c_1$ are present between the adjacent metal powders P contacting each other not entirely but partly, namely, in point contact or line contact.

In this state, the metal powders P are inserted into the sintering oven 4 together with the conveyor belt 2 to heat them at a required temperature. As a result, contact portions of the metal powders P fuse into each other. That is, they are connected with each other. Further, because the gaps $C_1$ remain present, the voids $C_1$ are present between the connected metal powders P, and as a result, a metallic porous foil 10 having a fine porous structure continuously is formed. After the metal powders P are sintered in the sintering oven 4 to form the metallic porous foil 10, it is introduced into the cooling oven 5 in which it is cooled at a required temperature and then wound as a coil 14.

Thereafter, the metallic porous foil 10 is being rewound, then it is conveyed vertically continuously and passed through a hopper 21 storing powder of an active substance (in the embodiment, hydrogen-storing alloy powder 20) to attach the hydrogen-storing alloy powders 20 to both surfaces of the metallic porous foil 10. The average particle diameter of the hydrogen-storing alloy powder 20 is 40 $\mu$m. The amount of an application thereof to the metallic porous foil 10 per centare is 0.1–30.0 kg/m$^2$. The density of the hydrogen-storing alloy powder is 5.0–6.5 g/cc.

A pair of press rollers 22A and 22B is disposed at the exit of the hopper 21. The metallic porous foil 10 to which the hydrogen-storing alloy powder 20 is attached is passed between the press rollers 22A and 22B to apply a required pressure to both surfaces of the metallic porous foil 10. Consequently, due to the pressing force of the press rollers 22A and 22B, the hydrogen-storing alloy powders 20 penetrate into the voids $C_1$ of the metallic porous foil 10 and attach to both surfaces thereof. In this manner, hydrogen-storing alloy layers 23A and 23B each having a predetermined thickness are formed.

Then, the metallic porous foil 10 is conveyed continuously to a tank 26 storing a liquid resinous binder 25, the binder 25 is coated on the surface of the hydrogen-storing alloy layers 23A and 23B on both surfaces of the metallic porous foil 10. At this time, the liquid resinous binder 25 penetrates into gaps between non-contact portions of the hydrogen-storing alloy powders 20 and hydrogen-storing alloy powder-unfilled voids (gaps) $C_1$ between metal powders.

Figure 2A:
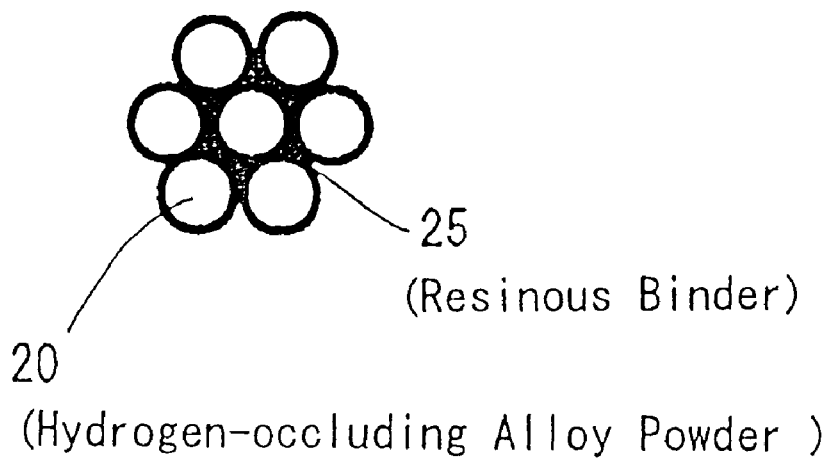
FIG. 2A is an enlarged view showing a state in which a resinous binder and hydrogen-storing alloy powders are mixed with each other according to a conventional method.

FIG. 2A shows the conventional method of forming a paste-like active substance by mixing the resinous binder 25 with hydrogen-storing alloy powders 20. In this case, the surface of each hydrogen-storing alloy powder 20 is entirely coated with the liquid resinous binder 25. On the other hand, according to the present invention, the metallic porous foil 10 attached with the hydrogen-storing alloy powders 20, without binder 25, is pressurized and immersed in the liquid resinous binder 25. In this case, as shown in FIG. 2B, portions in which the hydrogen-storing alloy powders 20 are in direct partial contact with each other are formed, and the liquid resinous binder 25 is filled in portions in which the hydrogen-storing alloy powders 20 are not in contact with each other.

Figure 3A:
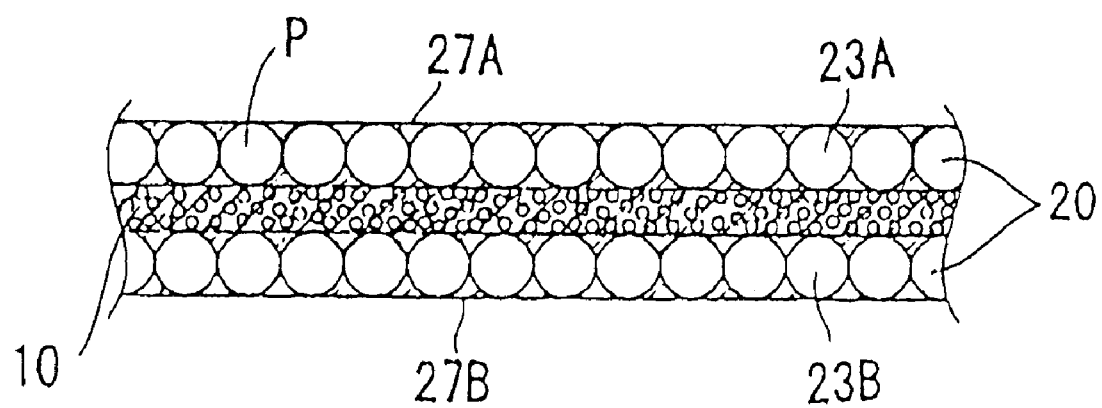
FIGS. 3A through 3D are enlarged views showing the process of forming a substrate in each stage of a processing of the present invention.

Then, the metallic porous foil 10 is introduced into a drying oven 28 to dry the liquid resinous binder 25. As a result, as shown in FIG. 3A, very thin coating layers 27A and 27B are formed on the surface of the hydrogen-storing alloy layers 23A and 23B formed on the surface of the metallic porous foil.

Then, the metallic porous foil 10 is sequentially passed between a plurality of (in the embodiment, four rollers) a pair of pressure rollers 30, 31, 32, and 33 arranged along a conveying path. As a result, an electrode 40 having a predetermined thickness is manufactured.

Figure 3B:
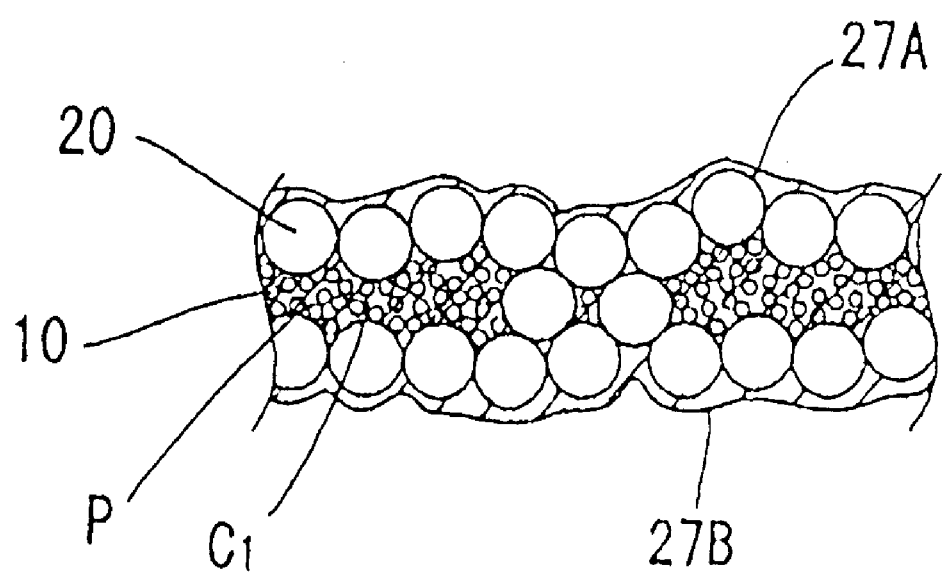
Figure 3C:
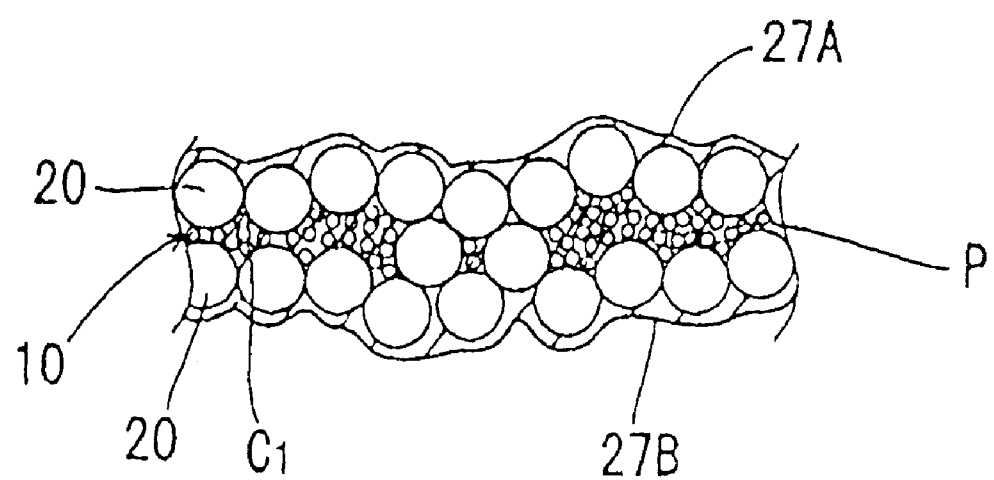
Figure 3D:
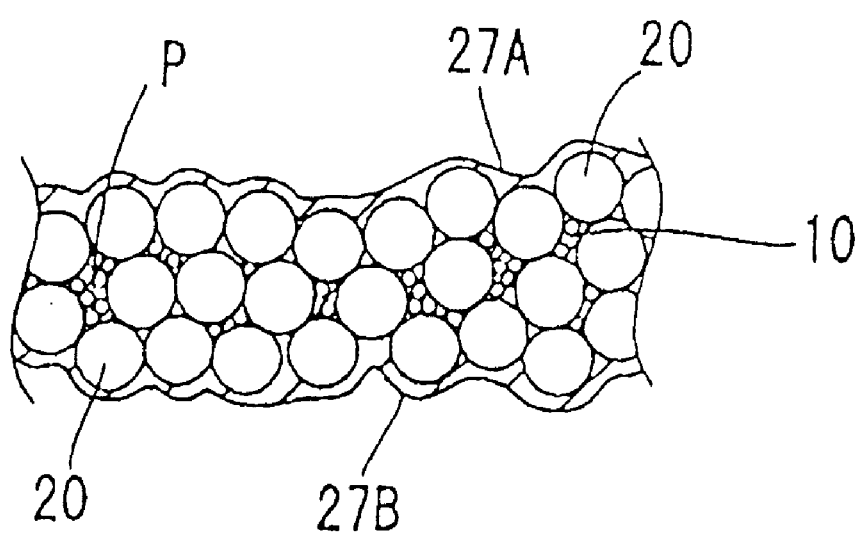

When the metallic porous foil 10 is passed through the first pressure roller 30, the hydrogen-storing alloy powders 20 penetrate into the voids $C_1$ of the metal powders P constituting the metallic porous foil 10. As a result, the metallic porous foil 10 has a state shown in FIG. 3B. When the metallic porous foil 10 is passed through the second pressure roller 31, the hydrogen-storing alloy powders 20 penetrate further into the voids $C_1$ of the metal powders P while they are widening the gaps (voids $C_1$). As a result, the metallic porous foil 10 has a state shown in FIG. 3C. When the metallic porous foil 10 is passed through the third pressure roller 32 and the fourth pressure roller 33, the hydrogen-storing alloy powders 20 penetrate into the voids $C_1$ of the metal powders P further, and the metallic porous foil 10 is in penetration into the hydrogen-storing alloy powders 20 as shown in FIG. 3D. As a result, the metallic porous foil 10 serves as a cushioning medium between the adjacent hydrogen-storing alloy powders.

The electrode fixed with the powder (hydrogen-storing alloy powder) of the active substance is more flexible than the conventional one and thus can be wound spirally smoothly without cracking it.

Figure 4:
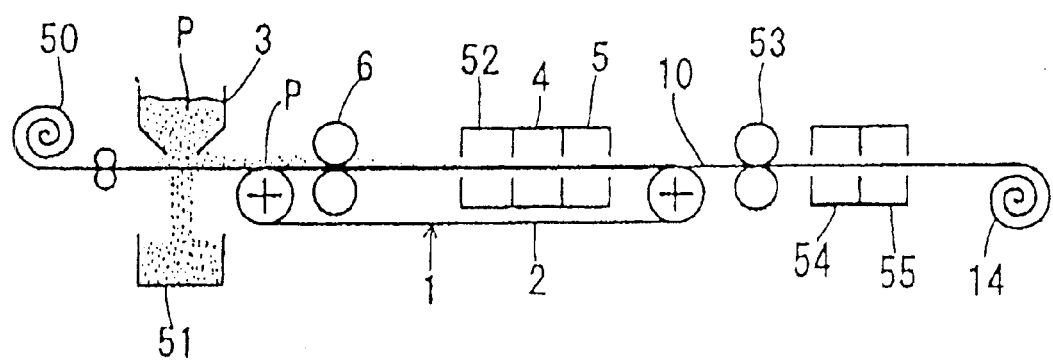
FIG. 4 is a partly schematic view of an apparatus for carrying out a method of a second embodiment of the present invention.

FIG. 4 shows the second embodiment. As a different point from the first embodiment, a supporting sheet 50 is used in the second embodiment. More specifically, after the metal powders P are spread on the supporting sheet 50, the supporting sheet 50 is placed on the conveyor belt 2, then the supporting sheet 50 is conveyed with the conveyor belt 2. The supporting sheet 50 consists of a resinous sheet having circular pores 50a similar to those punched on a metal sheet. Needless to say, the configuration of the supporting sheet 50 is not limited to "circular".

Figure 5A:
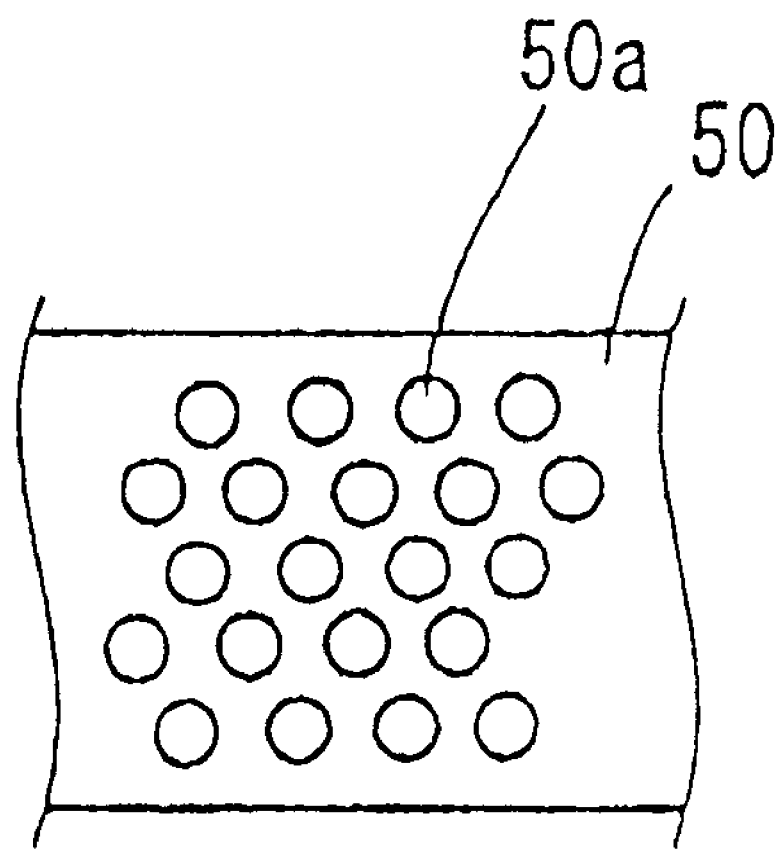
FIG. 5A is a plan view snowing a supporting sheet for use in the second embodiment.

As shown in FIG. 5, the circular pores 50a are formed at regular intervals lengthwise and widthwise through the supporting sheet 50 similar to those punched on a metal sheet. Thus, when the metal powders P are spread on the supporting sheet 50 from the hopper 3, the metal powders P drop through the circular pores 50a and accumulate on the upper surface of the supporting sheet 50, with the pores present thereon at regular intervals. The metal powders P which have dropped through the circular pores 50a are stored in a metal powder-receiver 51 installed at a position confronting the hopper 3 to recycle them.

As described above, with the metal powders P spread on the porous supporting sheet 50 supported on the conveyor belt 2 of the circulation driving apparatus 1, the conveyor belt 2 and the supporting sheet 50 are rolled by the pressure roller 6 at a low pressure, and then conveyed into a resin-removing oven 52 in which they are heated at a required temperature to burn the supporting sheet 50. Then, the conveyor belt 2 with the metal powder P is introduced into the sintering oven 4 and heated at a required temperature. In the sintering oven 4, the metal powders P are sintered to form a porous metallic foil. Thereafter, the porous metallic foil and the conveyor belt are introduced into the cooling oven 5, and then, the porous metallic foil is separated from the conveyor belt 2. Then, the porous metallic foil is passed between a pair of pressure rollers. 53 to roll it again at a low pressure, and then sintered in a second sintering oven 54. Then, it is cooled in a second cooling oven 55, and wound as a coil.

Then, in a process similar to that of the first embodiment, while the metallic porous foil thus formed is being rewound, it is conveyed continuously and an active substance is applied thereto. It is passed in a tank storing a liquid resinous binder and then it is dried. Thereafter, it is rolled by a plurality of rollers. The same parts of the second embodiment as those of the first embodiment are denoted by the same reference numerals.

Figure 5B:
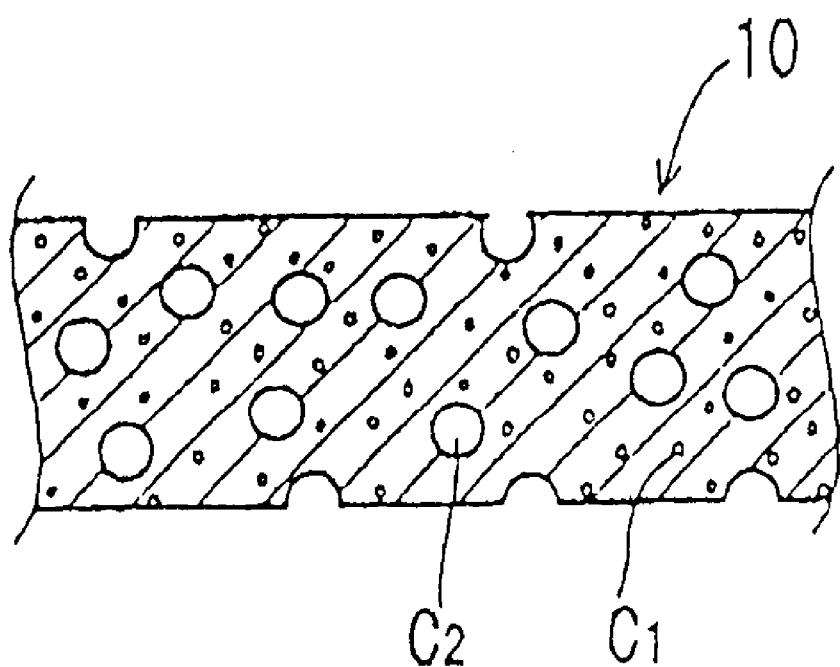
FIG. 5B is an enlarged horizontal sectional view showing a metallic porous foil formed in the second embodiment.

In the second embodiment, similarly to the first embodiment, contact surfaces of the spread metal powders are connected with each other to form a fine porous structure in the portion in which the circular pores 50a are not formed, whereas voids $C_2$ consisting of a comparatively large through-pore are formed at the portion corresponding to the circular pores 50a. That is, as shown in FIG. 5B, it is possible to continuously produce the metallic porous foil 10 having two kinds of voids, namely, the fine voids $C_1$ each consisting of a gap between the adjacent metal powders and the voids $C_2$ each consisting of a comparatively large through-pore and corresponding to the circular pores 50a.

In the second embodiment, sintering is performed a second time to soften the metallic porous foil.

Figure 6:
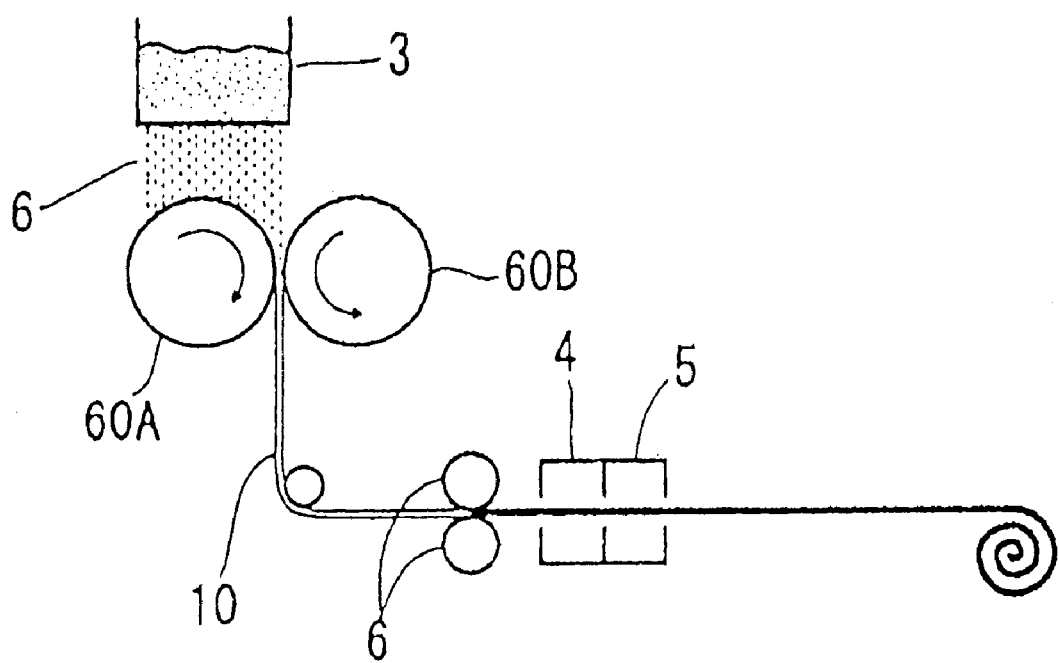
FIG. 6 is a partly schematic view of an apparatus for carrying out a method of a third embodiment of the present invention.

FIG. 6 shows the third embodiment. In the third embodiment, metal powders are supplied to the surface of a pair of pressure rollers 60A and 60B by spreading them directly thereon. Then, the metal powders are pressed between the pressure rollers 60A and 60B at a required pressure to fix contact portions of the adjacent metal powders with each other and form fine voids $C_1$ consisting of a gap between the adjacent metal powders. That is, the metallic porous foil 10 similar to that of the first embodiment is formed by adjusting the load of the rollers 60A and 60B.

Figure 7A:
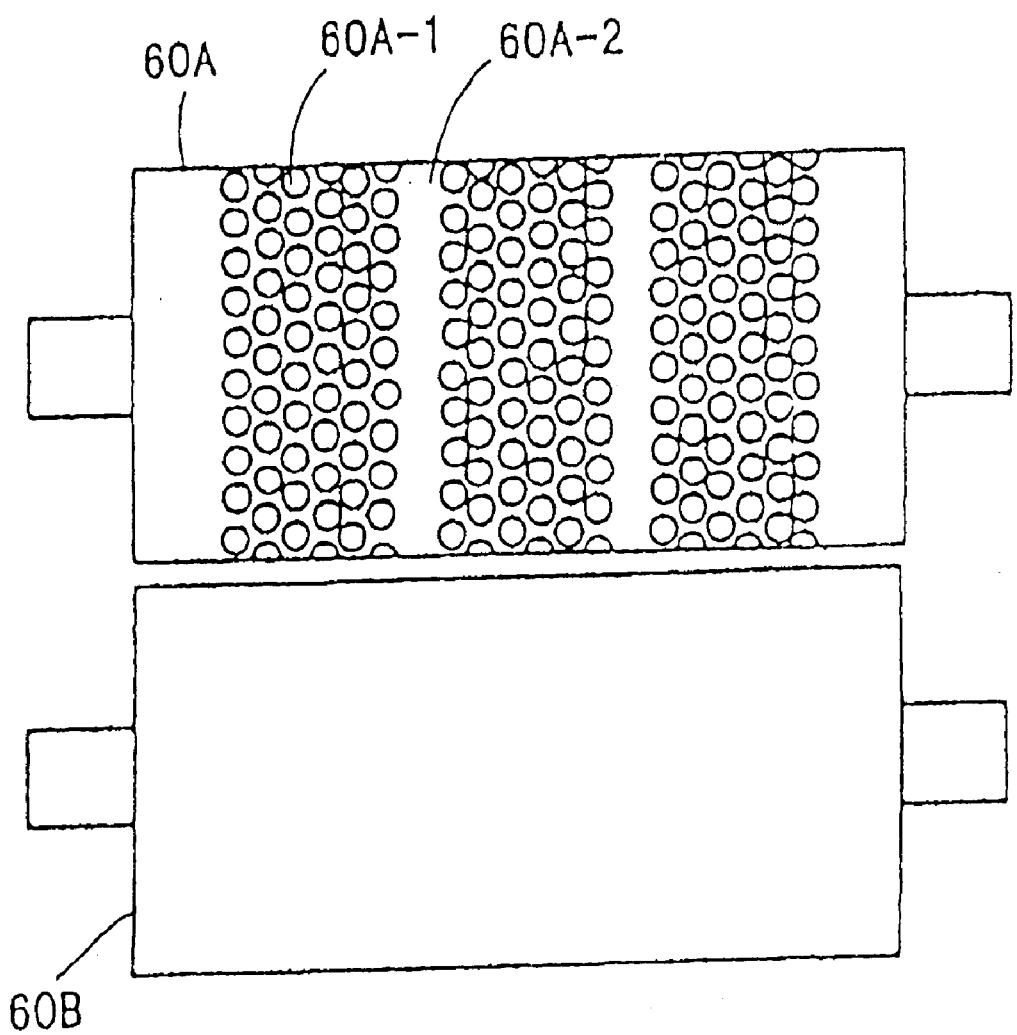
FIG. 7A is a plan view showing a pair of rollers for use in a fourth embodiment.
Figure 7B:
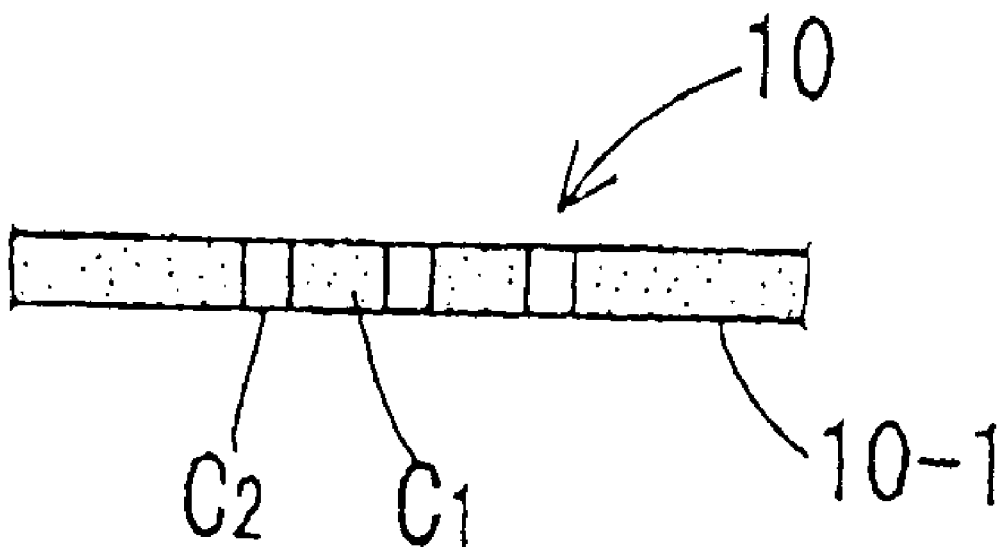
FIG. 7B is a schematic sectional view showing a metallic porous foil formed in the fourth embodiment.
Figure 8:
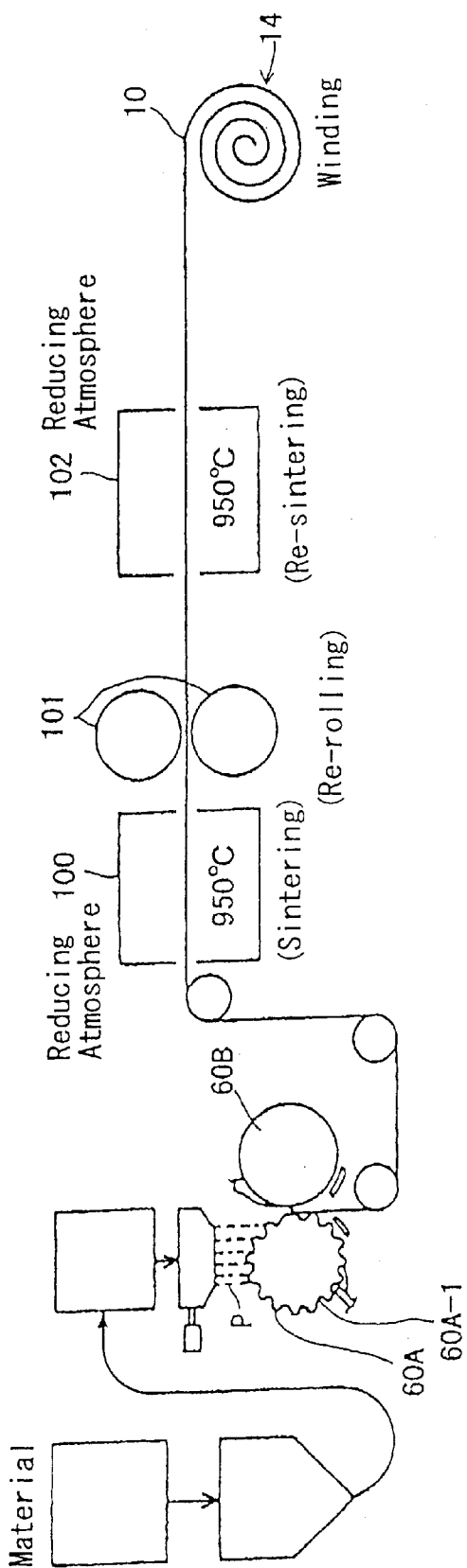
FIG. 8 shows the process of forming the metallic porous foil of the fourth embodiment.

FIGS. 7A, 7B, and 8 show the fourth embodiment. Similarly to the third embodiment, a metallic porous foil is formed from metal powder by using a pair of rollers 60A and 60B. As shown in FIG. 7A, a large number of concave portions 60A-1 are formed on a peripheral surface of the pattern roller 60A. A portion corresponding to each of the concave portions 60A-1 of the pattern roller 60A is formed as the void $C_2$ consisting of a through-pore similar to that of the second embodiment. That is, there is formed the metallic porous foil 10 having the voids $C_1$ each consisting of a fine gap between adjacent metal powders and the large voids C2 formed by using a pair of the rollers 60A and 60B. As shown in FIG. 7B, portions 60A-2 Proximate to the roller 60B are formed at regular intervals on the pattern roller 60A without the concave portions 60A-1, such that lead portions 10-1 having no voids is formed on the metallic porous foil 10.

First Experiment

A metallic porous foil 10' of the fourth embodiment was formed in a process shown in FIG. 8. That is, Ni (nickel) powder was spread directly on the surface of the roller 60B and the pattern roller 60A in an amount of 250 g/m$^2$, such that an apparent rate of pore area of the voids $C_2$ each consisting of a through-pore formed in correspondence to each of the concave portions 60A-1 was 48%. At that time, the Ni powders were rolled at a load of 187 kg/mm to form a metallic porous foal sheet having a thickness of 76 μm, a width of 100 mm, and a length of 10 m. The metallic porous foil sheet was introduced into a sintering oven 100 to sinter it at 950° C. for two minutes in a reducing atmosphere. Then, it was passed between a pair of pressure rollers 101 to roll it at a load of 154 kg/mm and then introduced into another sintering oven 102 to sinter it in the same condition as the above. The metallic porous foil was wound as a coil 14.

The metallic porous foil 10 wound as the coil was 58 μm in thickness, 3.8 kgf/20 mm in tensile force, and 3.6% in elongation. The void content of the metallic porous foil 10 was 14.4% (true density: 85.6%).

Then, similarly to the first embodiment, while the coil 14 was being rewound, hydrogen-storing alloy powders applied to the metallic porous foil 10 to form an electrode. Because the apparatus used in the experiment is the same as that of the first embodiment, the method of forming the electrode is described below with reference to FIG. 1. While the coil 14 was being rewound, it was conveyed vertically downward to introduce it into the hopper 21. The hopper 21 stored the hydrogen-storing alloy powders 20 of AB$_5$ type having an average diameter of 40 μm. The hydrogen-storing alloy powders 20 were applied to both surfaces of the metallic porous foil 10 such that the total thereof was 1450 g/m$^2$. The metallic porous foil 10 was passed between the rollers 22A and 22B of 150 mmφ disposed at the exit of the hopper 21 to load with 204 kg/mm thereto. At that time, the thickness of the metallic porous foil 10 fixed with the hydrogen-storing alloy powders was 0.3 mm, and the density of the hydrogen-storing alloy layers 23A and 23B formed on the surface of the metallic porous foil 10 was 5.37 g/cc.

Then, the metallic porous foil 10 was immersed in the liquid resinous binder 25 (SBR modified styrene-butadiene copolymer latex, solid content: 24%) stored in the tank 26, such that the binder 25 impregnates gaps between the hydrogen-storing alloy powders 20 and coat the surface of the hydrogen-storing alloy layers 23A and 23B therewith.

Then, the metallic porous foil 10 impregnated with the liquid resinous binder 25 was kept in the drying oven 28 at 80° C. for three minutes to harden the liquid resinous, binder 25.

Then, the metallic porous foil 10 was sequentially rolled by the first through fourth rollers 30–33 at a load of 95 kg/m respectively to produce the electrode 40. The electrode 40 was wound as a coil. As a result of the rolling performed by the first through fourth rollers 30–33, the thickness of the metallic porous foil 10 was reduced to 0.286 mm from 0.3 mm.

The obtained electrode 40 was 0.286 mm in thickness, had the hydrogen-storing alloy powders 20 per 1680 g/m$^2$, was 11.13 kgf/20 mm in tensile force, 0.96% in elongation, 15 mmΩ in electric resistance, 32 mm in deflection. The release (separation) property of the electrode 40 was examined by bending it at 180°. As a result, separation of the active substance layer did not occur.

The electric resistance value of the electrode 40 was less than half of that of the conventional one. The deflection of 32 mm is more than twice as great as that of conventional electrode which is less than 15 mm.

Figure 9:
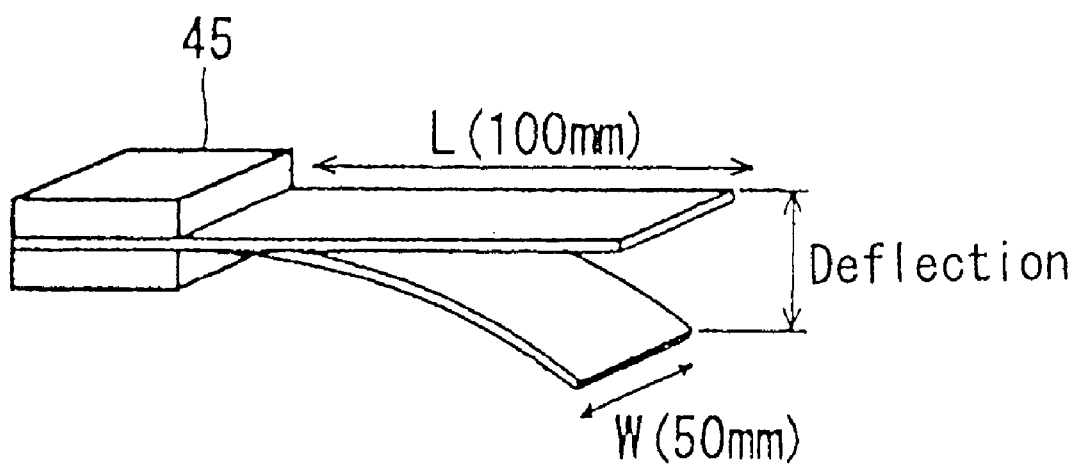
FIG. 9 is a schematic view showing a method of testing deflection.

The deflection test was conducted by a method shown in FIG. 9 to measure the degree of deflection of the electrode. In the test, the electrode had a width W of 50 mm, one end thereof was held by a fixing tool 45, and other end projected from the fixing tool 45 by 100 mm. The greater the deflection amount of the electrode is, the more flexible it is. Thus, it can be wound favorably when it is used as the electrode.

Figure 10A:
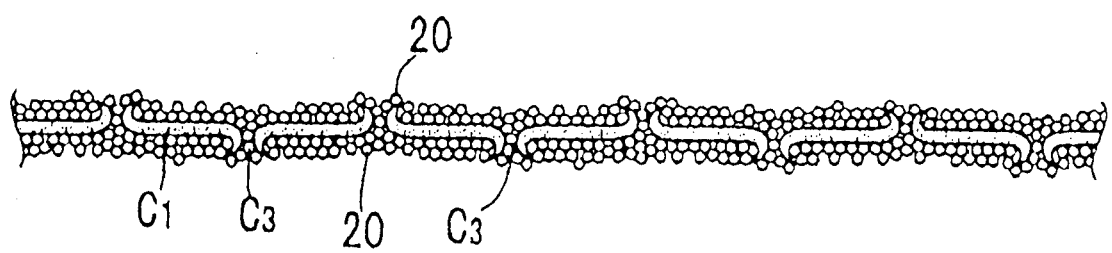
FIG. 10A is a sectional view showing a metallic porous foil of a fifth embodiment.
Figure 10B:
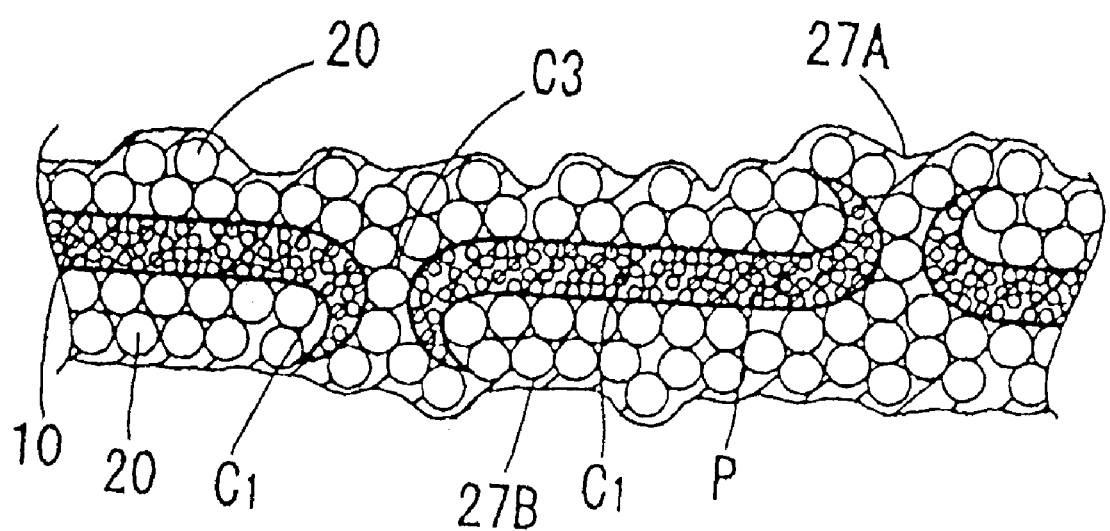
FIG. 10B is a view showing the metallic porous foil of the fifth embodiment by enlarging a part thereof.

FIGS. 10A and 10B show a metallic porous foil of the fifth embodiment formed from metal powder. Burr-formed pores $C_3$ are formed by needles or the like on the metallic porous foil having fine voids $C_1$ formed between adjacent metal powders. The burr of the burr-formed pore allows the metallic porous foil to hold powder of an active substance at an increased degree.

Figure 11A:
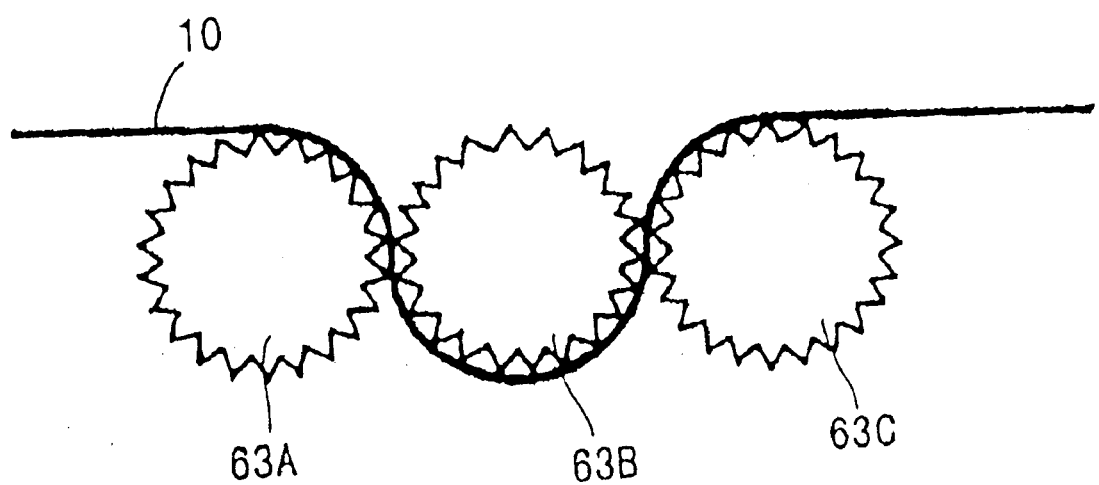
FIG. 11A is a schematic view showing a part of a method of forming a metallic porous sheet of the fifth embodiment.
Figure 11B:
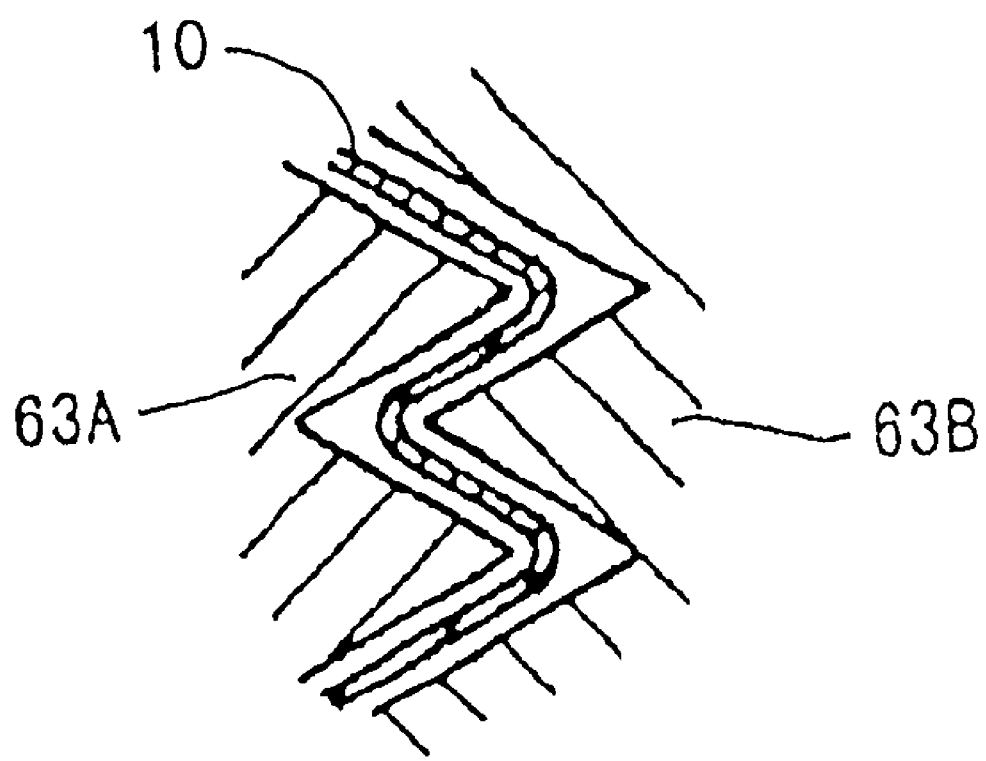
FIG. 11B is a partly enlarged view of FIG. 11A.

FIGS. 11A and 11B show the process of producing the metallic porous foil of the fifth embodiment. The sheet-shaped metallic porous foil 10 formed in the first through fourth embodiments are passed between rollers 63A and 63B and between rollers 63B and 63C to curve the metallic porous foil 10. In this manner, convex and concave portions are formed thereon.

Figure 12:
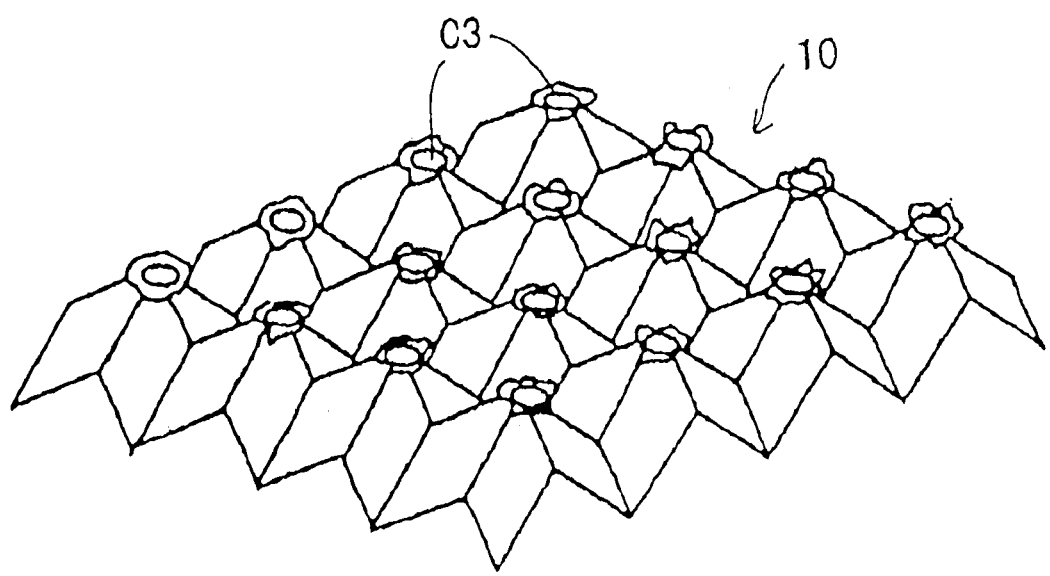
FIG. 12 is a perspective view showing a metallic porous foil of a modification of a sixth embodiment.

FIG. 12 shows the sixth embodiment. Similarly to the fifth embodiment, burr-formed pores $C_3$ are formed on a top portion of each of convex and concave portions of the metallic porous foil 10.

In any of the third through sixth embodiments, similarly to the first embodiment, dry powder of the active substance not mixed with paste is applied to the metallic porous foil. Then the powder of the active substance and the metallic porous foil are pressurized with a roller to fix the active substance to the metallic porous foil under pressure. Then, the active substance-fixed metallic porous foil is immersed in a liquid resinous binder. Then, the liquid resinous binder is dried. Finally, the metallic porous foil is passed through a plurality of rollers to penetrate the powders of the active substance into the metallic porous foil consisting of metal powders. In other words, the metallic porous foil penetrates into gaps between the adjacent powders of the active substance as a cushioning medium. In this manner, a flexible electrode is produced.

In producing the metallic porous foil by any of the methods of the first through sixth embodiments, it is preferable that the following physical properties of the metallic porous foil are in the range shown in table 1 below: thickness, application amount thereof per centare, rate of pore area (percentage of void $C_2$), tensile force, elongation, void content (percentage of void $C_1$), application amount of powder of the active substance that is fixed to the metallic porous foil per centare, density. It is preferable that the physical properties, namely, thickness, tensile force, and elongation of the electrode that is formed from the metallic porous foil are in the range shown in table 1 below:

TABLE 1

| Metallic porous foil | |
|---|---|
| Thickness | 10–500 μm |
| Amount/m$^2$ | 40 g/m$^2$–4.4 kg/m$^2$ |
| rate of pore area | 20–60% |
| Tensile force | 1–30 kgf/20 mm |
| Elongation | 0.6–30% |
| void content | 5–30% |
| Powder of active substance (hydrogen-storing alloy powder) | |
| Amount/m$^2$ | 0.1–30.0 kg/m$^2$ |
| Density | 5.0–6.5 g/cc |
| Electrode | |
| Thickness | 0.05–6.0 mm |
| Tensile force | 1–50 kgf/20 mm |
| Elongation | 0.3–30% |

The reason the thickness of the electrode is set to 0.05 mm–6.0 mm is because if it is less than 0.05 mm, the metallic porous foil has an insufficient strength and thus it is impossible to form the metallic porous foil having required performance; and if it is more than 6.0 mm, the metallic porous foil has an insufficient flexibility and thus it is difficult to obtain fine voids. The reason the tensile force of the electrode is set to 1–50 kgf/20 mm is because if it is less than 1 kgf/20 mm,; it is impossible to obtain favorable production efficiency in producing a battery by using the electrode plate; and if it is more than 50 kgf/20 mm, the tensile force is not favorable in producing the battery by the method of the present invention and thus it is impossible to produce the battery by using the electrode whose tensile force is more than 50 kgf/20 mm.

As apparent from the foregoing description, according to the present invention, the powder of the active substance such as the hydrogen-storing alloy powder is fixed under pressure to the metallic porous foil formed from metal powder, without adding the binder to the powder of the active substance; then, the active substance powder-fixed metallic porous foil is immersed: in the binder (binding agent). After the binder is dried, the metallic porous foil is passed between a plurality of a pair of pressure rollers to press it repeatedly. Consequently, a flexible electrode is obtained.

That is, the metallic porous foil formed from the metal powder is more flexible than the conventional metallic foil and has fine voids formed between adjacent metal powders. Thus, when the powder of the active substance such as the hydrogen-storing alloy powder is applied to the metallic porous foil under pressure, the alloy powders penetrate into the metallic porous foil to allow the metallic porous foil to serve as a cushioning medium between adjacent alloy powders. Accordingly, the metallic porous foil holds flexibility and the alloy powders at a high degree of strength.

Further, in the last process, the metallic porous foil is passed through a plurality of rollers to press it repeatedly. As a result, the alloy powders penetrate into the metallic porous foil. In other words, the metallic porous foil penetrates into gaps between the adjacent alloy powders. By pressurizing the metallic porous foil with alloy powder repeatedly, it serves as a cushioning medium, thus allowing it to be soft. On the other hand, in the case where a conventional metallic porous plate having punched pores formed thereon, the alloy powders cannot penetrate into adjacent metal powders thereof. Thus, when the metallic porous foil is pressurized repeatedly, the alloy powders are pressed against each other and become hard.

Furthermore, after the hydrogen-storing alloy powder is fixed to the metallic porous foil under pressure, the metallic porous foil is immersed in the resinous binder. Therefore, it is possible to allow the hydrogen-storing alloy powder to keep contacting directly each other, hold flow of electric current preferably, and reduce electric resistance.

According to the conventional method, because a pasty mixture of the hydrogen-storing alloy powder and the resinous binding agent is fixed to the metallic porous foil composing the base material of an electrode, the peripheral surface of each hydrogen-storing alloy powder is coated with the resinous binding agent and thus do not contact each other directly. Therefore, the flow of electric current is not favorable and electric resistance is high.

The present invention solves the problem of the conventional art. According to the present invention, the flow of electric current is favorable and electric resistance is low. Thus, the present invention provides an electrode having preferable electric characteristics.

Moreover, according to the present invention, it is possible to form fine three-dimensional pores between adjacent metal powders and through-pores respectively or in combination. Thus, it is possible to provide an electrode composed of the metallic porous foil corresponding to the kind of a battery. That is, the electrode of the present invention can be preferably applied to a nickel hydrogen battery, a nickel cadmium battery, a lithium primary battery, a lithium secondary battery, an alkaline dry cell, a fuel battery, and a battery for a vehicle.

After successively producing the metallic porous foil from metal powder, the powder of the active substance such as the hydrogen-storing alloy powder is supplied to the metallic porous foil to produce an electrode such as an electrode of hydrogen-storing alloy electrode for a battery successively. Thus, because it is possible to produce successively the metallic porous foil and the electrode composing the base material thereof, the productivity of the electrode can be enhanced dramatically.

What is claimed is:

1. An electrode for a battery produced by a process comprising the steps of:

continuously forming a metallic porous foil consisting of metal powders in which adjacent contact portions are fixed with each other and gaps between non-contact portions form fine voids;

applying powders of an active substance not containing a binder to a surface of said metallic porous foil while said metallic porous foil is being conveyed continuously;

filling said powders of said active substance into said fine voids of said metallic porous foil and fixing said powders of said active substance to said surface of said metallic porous foil under pressure by passing said metallic porous foil between a pair of rollers immediately after said powders of said active substance applies to said surface of said metallic porous foil or while said powders of said active substance is applying to said surface of said metallic porous foil;

forming a binder coating layer on surfaces of said powders of said active substance which have fixed to said surface of said metallic porous foil by introducing said metallic porous foil into a tank accommodating a liquid binder;

drying said binder coating layer by introducing said metallic porous foil into a drying oven; and setting a thickness of said metallic porous foil to a required one by passing said metallic porous foil sequentially between pressure rollers arranged along a conveying path.

2. An electrode according to claim 1, wherein said pressure rollers arranged downstream of said drying oven are a plurality of a pair of pressure rollers.

3. An electrode according to claim 1, wherein said metallic porous foil is formed from nickel powder, and said powders of said active substance is composed of mainly hydrogen-storing alloy powder to form a negative electrode of a nickel hydrogen battery.

4. The electrode for a battery according to claim 1, wherein said metallic porous foil has voids consisting of fine gaps between adjacent metal powders and pores being larger than said voids; and said powder of said active substance is filled into said voids and into said pores.

5. The electrode for a battery according to claim 1, wherein said metallic porous foil has burr-formed pores having burrs projecting from one surface or both surfaces thereof and/or concave and convex bent portions on one surface or both surfaces thereof; and said burrs and/or said concave and convex bent portions hold a layer of an active substance.

6. The electrode for a battery according to claim 1, wherein said metallic porous foil has a plurality of void-unformed lead portions formed at regular intervals; and a layer of powder of an active substance is not formed on a surface of said lead portion.

7. A battery having an electrode for a battery according to claim 1.

8. An electrode for a battery produced by a process, comprising the steps of:

continuously forming a metallic porous foil consisting of metal powders in which adjacent contact portions are fixed with each other and gaps between non-contact portions form fine voids;

applying powders of an active substance not containing a binder to both surfaces of said metallic porous foil while said metallic porous foil is being conveyed continuously by introducing said metallic porous foil into a hopper accommodating said powders of active substance;

filling said powders of said active substance into said fine voids of said metallic porous foil and fixing said powders of said active substance to said surfaces of said metallic porous foil under pressure by passing said metallic porous foil between a pair of rollers disposed at an exit position of said hopper immediately after said powders of said active substance are applied to said surfaces of said metallic porous foil or while said powders of said active substance are being applied to said surface of said metallic porous foil to form a layer of said active substance powders; and forming a binder coating layer on surfaces of said powders of said active substance which have been applied to said surfaces of said metallic porous foil by introducing said metallic porous foil into a tank accommodating a liquid binder;

drying said binder coating layers by introducing said metallic porous foil into a drying oven; and setting a thickness of said metallic porous foil to a required one by passing said metallic porous foil sequentially between pressure rollers arranged along a conveying path.

* * * * *